United States Patent
Kobayashi et al.

(10) Patent No.: US 7,416,512 B2
(45) Date of Patent: Aug. 26, 2008

(54) SHIFT CONTROL APPARATUS AND METHOD FOR CONTINUOUSLY VARIABLE TRANSMISSION

(75) Inventors: Atsufumi Kobayashi, Kanagawa (JP); Takuro Kawasumi, Tokyo (JP)

(73) Assignee: Jatco Ltd, Shizuoka (JP)

( * ) Notice: Subject to any disclaimer, the term of this patent is extended or adjusted under 35 U.S.C. 154(b) by 302 days.

(21) Appl. No.: 11/411,122

(22) Filed: Apr. 26, 2006

(65) Prior Publication Data

US 2006/0240942 A1    Oct. 26, 2006

(30) Foreign Application Priority Data

Apr. 26, 2005  (JP)  ............................. 2005-127936

(51) Int. Cl.
*F16H 61/662*   (2006.01)
(52) U.S. Cl. ........................................ 477/43
(58) Field of Classification Search ............ 701/55, 701/58
See application file for complete search history.

(56) References Cited

U.S. PATENT DOCUMENTS

| | | | |
|---|---|---|---|
| 4,764,155 | A | 8/1988 | Kumura et al. |
| 6,174,261 | B1 * | 1/2001 | Watanabe et al. ............. 477/43 |
| 7,011,602 | B2 | 3/2006 | Makiyama et al. |

FOREIGN PATENT DOCUMENTS

| | | |
|---|---|---|
| JP | 2593432 B2 | 12/1996 |
| JP | 2004-183854 A | 7/2004 |

* cited by examiner

*Primary Examiner*—Dirk Wright
(74) *Attorney, Agent, or Firm*—Foley & Lardner LLP

(57) ABSTRACT

A shift control apparatus for a continuously-variable transmission includes an operating condition sensing section; a normal-time speed ratio determining section; a normal-time control section; a kickdown-acceleration request determining section; a kickdown-acceleration-time control section; and an accelerator-operation-quantity variation-rate limiting section. The kickdown-acceleration-time control section is configured to set a kickdown-acceleration-time target speed ratio in accordance with a vehicle speed and an accelerator operation quantity, to cause an output rotational speed of the transmission to increase substantially linearly with an increase of input rotational speed of the transmission, when the kickdown-acceleration request determining section determines that a kickdown acceleration request is present, and to control the speed ratio in accordance with the kickdown-acceleration-time target speed ratio. The accelerator-operation-quantity variation-rate limiting section is configured to calculate a corrected accelerator operation quantity by imposing a limitation on a variation rate of the accelerator operation quantity, when a predetermined variation of the sensed accelerator operation quantity occurs during the speed ratio control of the kickdown-acceleration-time control section, and to output the corrected accelerator operation quantity to the kickdown-acceleration-time control section in order to set the kickdown-acceleration-time target speed ratio.

12 Claims, 10 Drawing Sheets

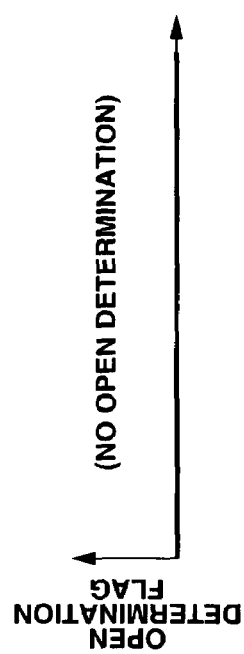
FIG.8D (NO OPEN DETERMINATION)
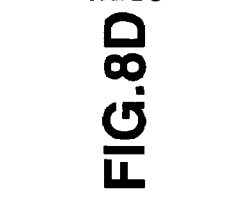
FIG.8E VARIATION LIMITER ACTIVE
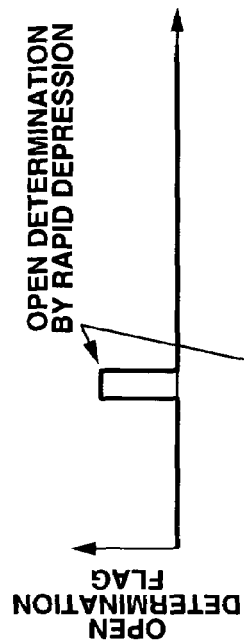
FIG.8F SPEED INCREASE SUPPRESSION
GRADUAL DEPRESSION
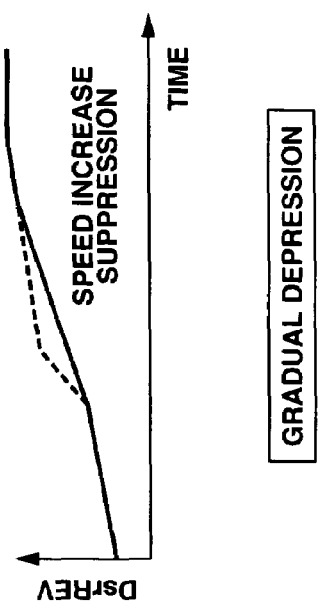
FIG.8A OPEN DETERMINATION BY RAPID DEPRESSION
FIG.8B (VARIATION LIMITER INACTIVE)
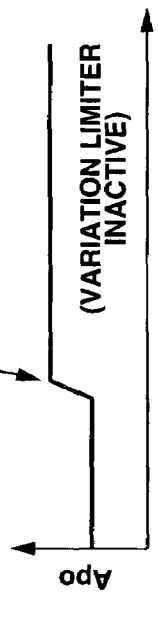
FIG.8C FAVORABLE-RESPONSE SHIFT
RAPID DEPRESSION

SHIFT CONTROL APPARATUS AND METHOD FOR CONTINUOUSLY VARIABLE TRANSMISSION

BACKGROUND OF THE INVENTION

The present invention relates to shift control apparatus and method for a continuously-variable transmission mounted in a vehicle.

When carrying out a shift control for a continuously-variable transmission mounted in a vehicle, in general, a target speed ratio (i.e., transmission ratio) is determined from a target rotational speed of an input shaft according to an operating condition of the vehicle by using a map. Such a map represents a shift pattern according to a vehicle speed and an accelerator operation quantity (i.e., accelerator manipulated variable), and has been stored as a map of the target input-shaft rotational speed. In such a case, the map represents a shift (pattern) line every range of the accelerator operation quantity, so as to produce a favorable acceleration of the vehicle at the time of vehicle start. Hence, a down-shift amount becomes excessive when reaccelerating the vehicle, e.g., at the time of a kickdown operation. Accordingly at this time, the engine speed excessively increases, and a time lag in the production of driver's expected (desired) acceleration is caused.

As a countermeasure against such a problem, it is conceivable that a variation of speed ratio is made to be suppressed at the time of a request of high acceleration. A Japanese Patent No. 2593432 exemplifies a previously proposed technique for controlling a continuously variable transmission. In this technique, the speed ratio is fixed at a constant value when a throttle opening degree becomes greater than or equal to a threshold value. In this technique, the fixed constant value of speed ratio is determined to take on a speed ratio value of the time when the throttle opening reaches the threshold value, shown on a shift map. Thus by fixing the speed ratio so as not to enlarge the speed ratio, the increase of engine speed produces an increase of a driving force of vehicle quickly (immediately). Thereby, the time lag between a time when the throttle opening increases and a time when the driver obtains an acceleration feeling is shortened. Accordingly, an uncomfortable feeling is reduced, and a feeling responsiveness of acceleration is enhanced.

However, in the technique disclosed in the above Japanese Patent, the speed ratio is kept at the constant value unless the throttle opening returns below than the threshold value and its hysteresis setting. Namely, the speed ratio does not vary, even after the initial acceleration request of the driver has been satisfied. This causes the driver to feel uncomfortable (i.e., feel odd). Therefore, in order to resolve this uncomfortable feeling, a Japanese Patent Application Publication No. 2004-183854 exemplifies a previously proposed technique; which is constructed for providing the increase of vehicle speed according to the driver's acceleration request, even at the time of vehicle reacceleration such as the kickdown acceleration, in the similar manner as at the time of a vehicle acceleration from standstill.

This technique is configured to switch between a map shift mode and a map-less shift mode. In the map shift mode, the speed ratio is variably controlled by tracing a shift map prepared so as to relate the speed ratio to the vehicle speed and the accelerator operation quantity. In the map-less shift mode, the shift is carried out by means of a map-less shift control which does not trace the shift map, when a predetermined condition related to acceleration is satisfied (reacceleration such as the kickdown operation).

SUMMARY OF THE INVENTION

However in the above-described technique of Japanese Patent Application Publication, when the driver varies an accelerator opening (degree) during the reacceleration, for example by additionally depressing an accelerator pedal; there is a case that a control reflecting the driver's accelerator operation executed during the reacceleration cannot be performed. Namely, when the driver additionally depresses the accelerator, after depressing the accelerator for the vehicle reacceleration; there is a possibility that a control securing a synchronism between the engine speed and the vehicle speed cannot be performed.

It is, therefore, an object of the present invention to provide shift control apparatus and method for a continuously-variable transmission, which is devised to secure the synchronism between the engine speed and the vehicle speed.

According to one aspect of the present invention, there is provided a shift control apparatus for a continuously-variable transmission, comprising: an operating condition sensing section configured to sense an operating condition of a vehicle, the operating condition including a vehicle speed and an accelerator operation quantity; a normal-time speed ratio determining section configured to determine a normal-time target speed ratio of the continuously-variable transmission in accordance with the vehicle speed and the accelerator operation quantity sensed by the operating condition sensing section; a normal-time control section configured to control a speed ratio of the continuously-variable transmission in accordance with the normal-time target speed ratio determined by the normal-time speed ratio determining section; a kickdown-acceleration request determining section configured to determine whether or not a kickdown acceleration request is present, in accordance with the accelerator operation quantity sensed by the operating condition sensing section; a kickdown-acceleration-time control section configured to set a kickdown-acceleration-time target speed ratio in accordance with the vehicle speed and the accelerator operation quantity sensed by the operating condition sensing section, to cause an output rotational speed of the continuously-variable transmission to increase substantially linearly with an increase of input rotational speed of the continuously-variable transmission, when the kickdown-acceleration request determining section determines that the kickdown acceleration request is present, and to control the speed ratio in accordance with the kickdown-acceleration-time target speed ratio instead of the normal-time target speed ratio; and an accelerator-operation-quantity variation-rate limiting section configured to calculate a corrected accelerator operation quantity by imposing a limitation on a variation rate of the accelerator operation quantity sensed by the operating condition sensing section, when a predetermined variation of the sensed accelerator operation quantity occurs during the speed ratio control of the kickdown-acceleration-time control section, and to output the corrected accelerator operation quantity to the kickdown-acceleration-time control section in order to set the kickdown-acceleration-time target speed ratio.

According to another aspect of the present invention, there is provided a shift control method for a continuously-variable transmission, comprising: sensing an operating condition of a vehicle, the operating condition including a vehicle speed and an accelerator operation quantity; determining a normal-time target speed ratio of the continuously-variable transmission in accordance with the sensed vehicle speed and the sensed accelerator operation quantity, under a normal running of the vehicle; controlling a speed ratio of the continuously-variable transmission in accordance with the determined normal-time target speed ratio; determining whether or not a kickdown acceleration request is present, in accordance with the sensed accelerator operation quantity; setting a kickdown-acceleration-time target speed ratio in accordance with the sensed vehicle speed and the sensed accelerator operation quantity, to cause an output rotational speed of the continuously-variable transmission to increase substantially linearly with an increase of input rotational speed of the continuously-variable transmission, when determining that the kickdown acceleration request is present under the normal running of the vehicle; controlling the speed ratio in accordance with the set kickdown-acceleration-time target speed ratio instead of the normal-time target speed ratio; calculating a corrected accelerator operation quantity by imposing a limitation on a variation rate of the sensed accelerator operation quantity, when a predetermined variation of the sensed accelerator operation quantity occurs during the speed ratio control according to the kickdown-acceleration-time target speed ratio; and setting the kickdown-acceleration-time target speed ratio in accordance with the corrected accelerator operation quantity.

According to still another aspect of the present invention, there is provided a shift control apparatus for a continuously-variable transmission, comprising: means for sensing an operating condition of a vehicle, the operating condition including a vehicle speed and an accelerator operation quantity; means for determining a normal-time target speed ratio of the continuously-variable transmission in accordance with the sensed vehicle speed and the accelerator operation quantity; means for controlling a speed ratio of the continuously-variable transmission in accordance with the determined normal-time target speed ratio; means for determining whether or not a kickdown acceleration request is present, in accordance with the sensed accelerator operation quantity; means for setting a kickdown-acceleration-time target speed ratio in accordance with the sensed vehicle speed and the sensed accelerator operation quantity, to cause an output rotational speed of the continuously-variable transmission to increase substantially linearly with an increase of input rotational speed of the continuously-variable transmission, when it is determined that the kickdown acceleration request is present, and controlling the speed ratio in accordance with the kickdown-acceleration-time target speed ratio instead of the normal-time target speed ratio; and means for calculating a corrected accelerator operation quantity by imposing a limitation on a variation rate of the sensed accelerator operation quantity, when a predetermined variation of the sensed accelerator operation quantity occurs during the speed ratio control according to the kickdown-acceleration-time target speed ratio, and setting the kickdown-acceleration-time target speed ratio in accordance with the corrected accelerator operation quantity instead of the sensed accelerator operation quantity.

The other objects and features of this invention will become understood from the following description with reference to the accompanying drawings.

BRIEF DESCRIPTION OF THE DRAWINGS

FIGS. 8A to 8C are diagrams each explaining a variation-rate limitation of accelerator operation quantity during the linear mode control, with respect to a rapid increase in accelerator operation quantity. FIGS. 8D to 8F are diagrams each explaining the variation-rate limitation of accelerator operation quantity during the linear mode control, with respect to a gradual increase in accelerator operation quantity.

DETAILED DESCRIPTION OF THE INVENTION

Reference will hereinafter be made to the drawings in order to facilitate a better understanding of the present invention.

Figure 1:
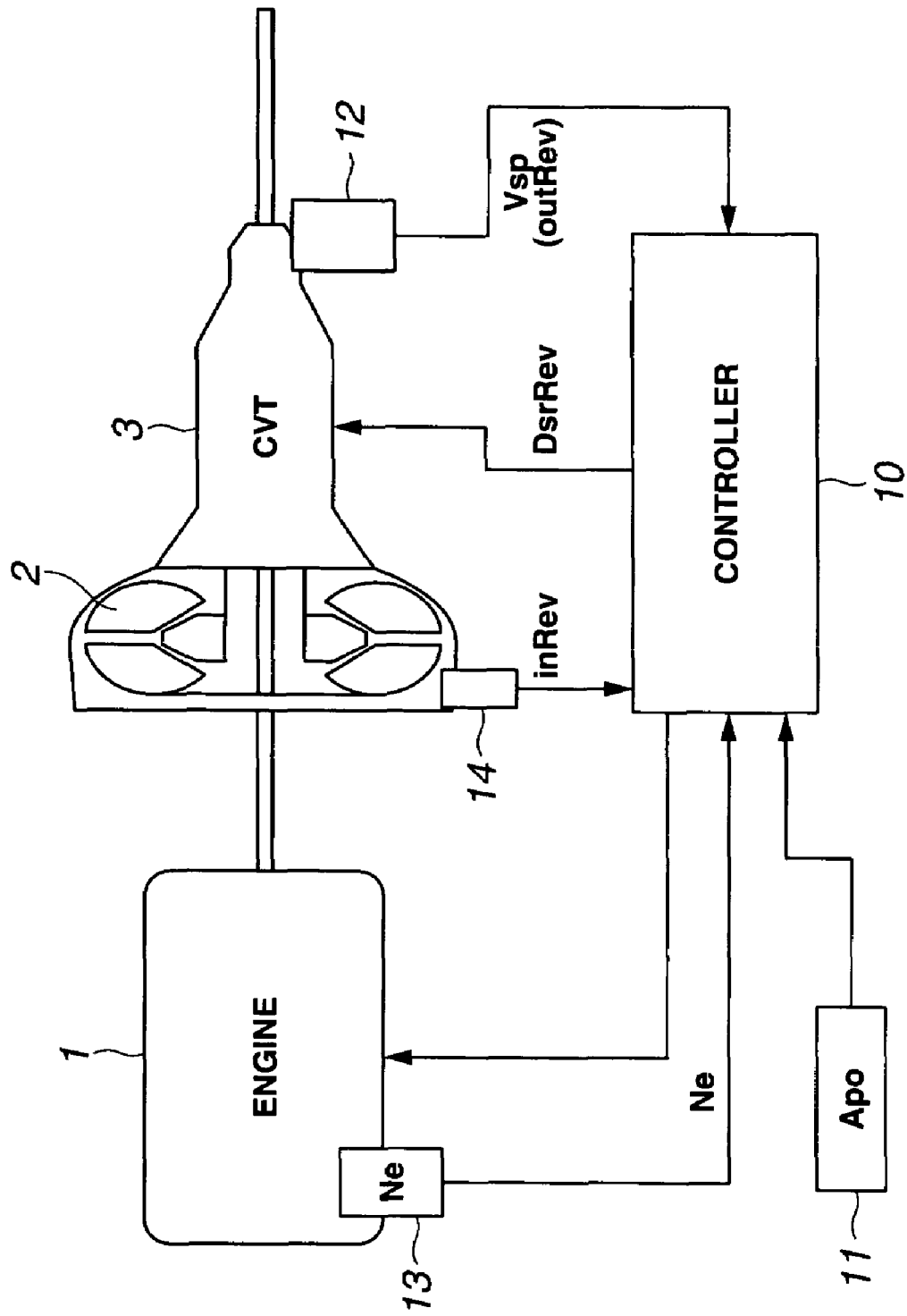
FIG. 1 is a schematic diagram showing a configuration of continuously-variable transmission in an embodiment according to the present invention.

At first, a shift control apparatus for a continuously-variable transmission in a first embodiment according to the present invention will now be explained. FIG. 1 is a schematic diagram showing a drive train configuration of vehicle according to the first embodiment. As shown in FIG. 1, an engine 1 is connected with a continuously-variable transmission 3 equipped with a torque converter 2. A controller 10 is configured to control an output of engine 1 and a speed ratio (=pulley ratio) of continuously-variable transmission 3, to achieve an optimum operating condition in accordance with a running condition of vehicle. It is noted that a continuous shift mechanism of continuously-variable transmission 3 can adopt a V-belt type mechanism, a toroidal type mechanism or the like.

Controller 10 includes an engine control section (or means) and a shift control section (or means), and is configured as an integrated control unit. The engine control section carries out a fuel injection quantity control and an ignition timing control for engine 1 and the like, in accordance with the operating condition. On the other hand, the shift control section continuously (in stepless) controls the speed ratio of continuously-variable transmission 3 in accordance with the operating condition. Controller 10 is connected with an accelerator position sensor 11, a vehicle speed sensor 12, an engine speed sensor 13, an input shaft speed sensor 14, and the like. Accelerator position sensor 11 serves to sense an accelerator operation quantity (or accelerator pedal manipulated variable, i.e. accelerator opening degree) Aposen. Vehicle speed sensor 12 serves to sense a running speed Vsp of the vehicle (hereinafter, also called vehicle speed). Engine speed sensor 13 serves to sense a rotational speed Ne of engine 1. Input shaft speed sensor 14 serves to sense an input-shaft rotational speed inREV of continuously-variable transmission 3. These sensors function as an operating condition sensing section for sensing the operating condition of the vehicle. In this embodiment, vehicle speed sensor 12 senses an output-shaft rotational speed OutRev of continuously-variable transmission 3. Then, vehicle speed sensor 12 determines vehicle speed Vsp, by multiplying this sensed speed OutRev by a constant determined base on a final reduction ratio or vehicle specifications (such as a wheel radius).

[Basic Concepts and Configurations]

In order to providing an increase of vehicle speed Vsp according to a driver's acceleration request, even at the time of vehicle reacceleration such as a kickdown acceleration in the similar manner as at the time of a vehicle acceleration from standstill; the shift control apparatus of this embodiment is configured to switch between a map shift mode (a normal-mode shift control) and a map-less shift mode (a linear-mode shift control). In the map-less shift mode, a shift characteristic of down-shift and a shift characteristic of up-shift are respectively determined on the basis of accelerator operation quantity Apo and vehicle speed Vsp. Thereby, a down-shift target speed ratio suppressed compared with a normal target speed ratio (of the map shift mode) is calculated in accordance with the determined down-shift characteristic (this calculation is done by a down-shift target value calculating section of controller 10). Moreover, an up-shift target speed ratio is calculated in accordance with the determined up-shift characteristic (an up-shift target value calculating section). Accordingly, the shift control for transmission 3 is carried out, based on an imaginary shift line which is described so as to cause the speed ratio to shift upwardly according to the up-shift target speed ratio after to shift downwardly to the down-shift target speed ratio. In other words, the imaginary shift line provides the target speed ratio (values), so as to shift speed ratio downwardly to the down-shift target speed ratio calculated by the down-shift target-value calculating section and subsequently so as to shift speed ratio upwardly in accordance with the up-shift target speed ratio calculated by the up-shift target-value calculating section.

Figure 2A:
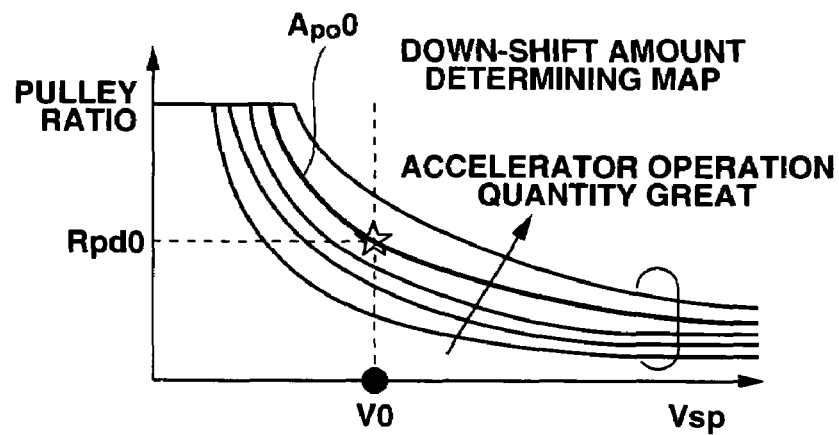
FIG. 2A is a diagram showing a down-shift amount regulation map which is used for a shift control at the time of kickdown operation and which determines a down-shift amount every acceleration operation quantity with reference to vehicle speed.
Figure 2B:
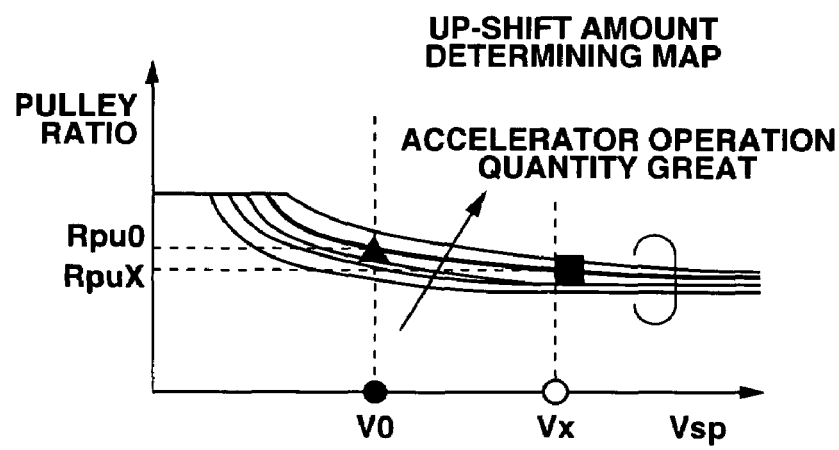
FIG. 2B is a diagram showing an up-shift amount regulation map which is used for the shift control at the time of kickdown operation and which determines an up-shift amount every acceleration operation quantity with reference to vehicle speed.

Namely, the down-shift target speed ratio is calculated by using a down-shift amount determining map as shown in FIG. 2A, and the up-shift target speed ratio is calculated by using an up-shift amount determining map as shown in FIG. 2B. In these maps, a variation amount of speed ratio is related to vehicle speed Vsp, and is described with respect to every range of accelerator operation quantity Apo. These ranges are predetermined by dividing a whole area of accelerator operation quantity Apo into proper number of steps. As shown in FIG. 2A, in the case where accelerator operation quantity Apo is small, namely in the case of the counter-direction side of an arrow designating accelerator operation quantity; the down-shift amount is set to become small. In the case where accelerator operation quantity Apo is large, namely in the case of the arrow direction side of FIG. 2A; the down-shift amount becomes large. Thereby, an excessive down-shift amount is suppressed and an excessive increase in engine speed is prevented, at the time of kickdown operation. Moreover, the down-shift amount is set to be more reduced as vehicle speed Vsp becomes larger. Thereby, it is prevented that an engine noise grows excessively large by means of the kickdown acceleration when the vehicle is running at high speed.

Figure 3:
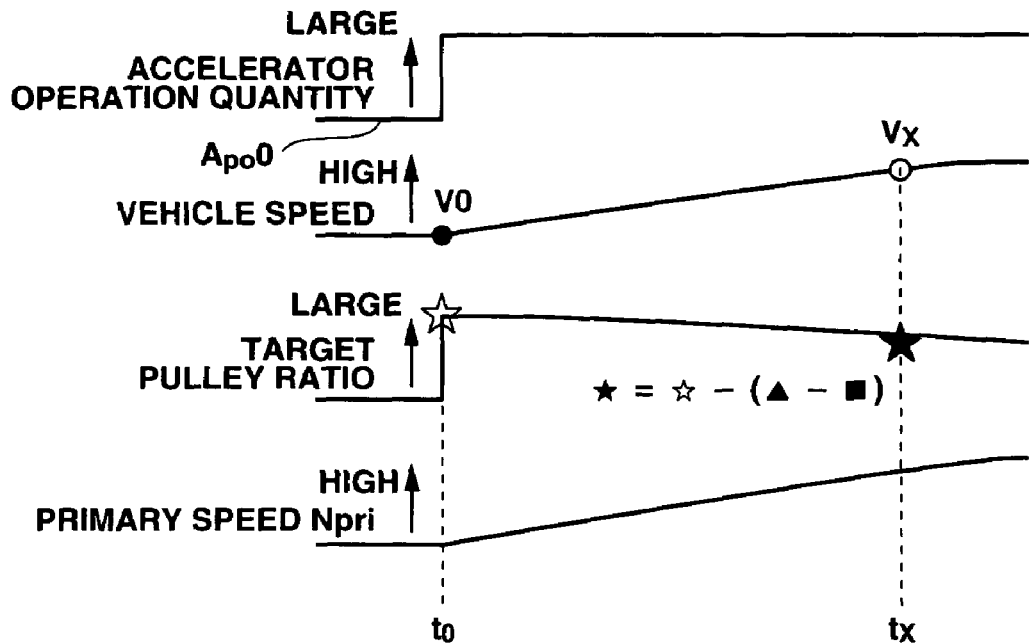
FIG. 3 is an explanatory diagram showing a linear mode control at the time of kickdown operation.

For example as shown in FIG. 3, when the kickdown operation (i.e., rapid increase in accelerator opening) occurs under the condition where accelerator operation quantity Apo is equal to Apo0 and vehicle speed Vsp is equal to V0 at a time point t0, the pulley-ratio variation amount equal to Rpd0 is selected as the down-shift amount, by looking up FIG. 2A. This value of Rpd0 corresponds to the condition where accelerator operation quantity Apo is equal to Apo0 and vehicle speed Vsp is equal to V0 (cf. open star ☆ of FIG. 2A). Then, this value Rpd0 of pulley-ratio variation amount is added to a current pulley ratio Rpa. Thereby, a target pulley ratio (=target speed ratio) Rpa0 is set at equal to Rpa+Rpd0, toward down-shift side by the additional value Rpd0. Target pulley ratio Rpa0=Rpa+Rpd0 Thus, the down shift is carried out so as to bring the actual pulley ratio closer to this target pulley ratio.

Since this down-shift target pulley ratio Rpa0 is set so as not to allow the down shift to become excessive, the engine speed (cf. primary pulley speed Npri) is prevented from increasing excessively, as shown in FIG. 3. Then, when the actual pulley ratio reaches the target pulley ratio, a down-shift mode is changed to an up-shift mode. In this up-shift mode, a difference Rpu0–RpuX between the pulley-ratio variation amount equal to Rpu0 and the pulley-ratio variation amount equal to RpuX is calculated as the up-shift amount, by looking up FIG. 2B. This value of Rpu0 corresponds to the condition where accelerator operation quantity Apo is equal to Apo0 and vehicle speed Vsp is equal to V0 at the time of kickdown operation (cf. filled delta ▲ of FIG. 2B). And, the value of RpuX corresponds to a current condition where accelerator operation quantity Apo is equal to ApoX and vehicle speed Vsp is equal to VX (cf. filled square ■ of FIG. 2B). It is noted that this current condition means a condition of the time when the calculation of difference is carried out. Then, new target pulley ratio is determined by subtracting the calculated up-shift amount (Rpu0–RpuX) from the target pulley ratio (namely, the target pulley ratio Rpa0 set toward down-shift side at the time of kickdown operation). New target pulley ratio Rpa0=Rpa0–(Rpu0–RpuX)

Figure 4:
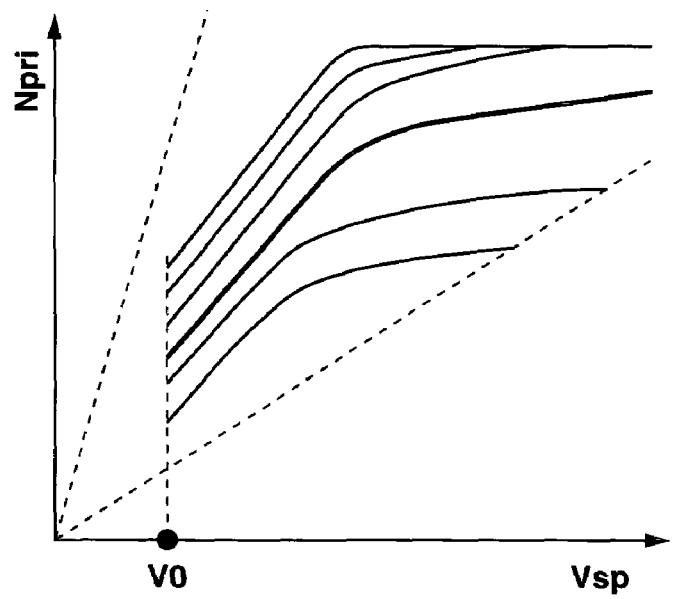
FIG. 4 is a shift-line diagram explaining the linear mode control at the time of kickdown operation.

Thus, the up shift is started after the down shift has been done. Since the up shift according to the increase of vehicle speed is performed, primary pulley speed Npri corresponding to the engine speed increases in synchronism with vehicle speed Vsp (i.e., increases linearly with vehicle speed Vsp with keeping in balance), as shown in FIG. 3. For example, a thick solid line in FIG. 4 represents a shift line (or speed variation) of this case. As shown in FIG. 4, primary speed Npri and vehicle speed Vsp increase substantially linearly with each other, after the kickdown operation, namely after vehicle speed Vsp became equal to V0. Afterward, the speed ratio is gradually varied toward high speed side. Thereby, the increase in vehicle speed is achieved, for example, vehicle speed Vsp has a value equal to VX at a time point tX.

In the above-described configuration, the synchronism (linearity) between the engine speed and the vehicle speed can be obtained, in the case of re-acceleration condition where the accelerator opening is constant once the accelerator pedal was depressed. However, when the driver varies the accelerator opening during the re-acceleration, for example by additionally depressing the accelerator pedal; the shift control is performed by respectively rearranging the shift characteristic of down-shift and the shift characteristic of up-shift by using an interpolation calculation and the like. As a result, there is a case that a control reflecting the driver's accelerator operation executed during the reacceleration cannot be achieved. Namely, when the driver additionally depresses the accelerator, after depressing the accelerator for the vehicle reacceleration; there is a possibility that a control securing the synchronism between the engine speed and the vehicle speed cannot be performed.

Figure 5:
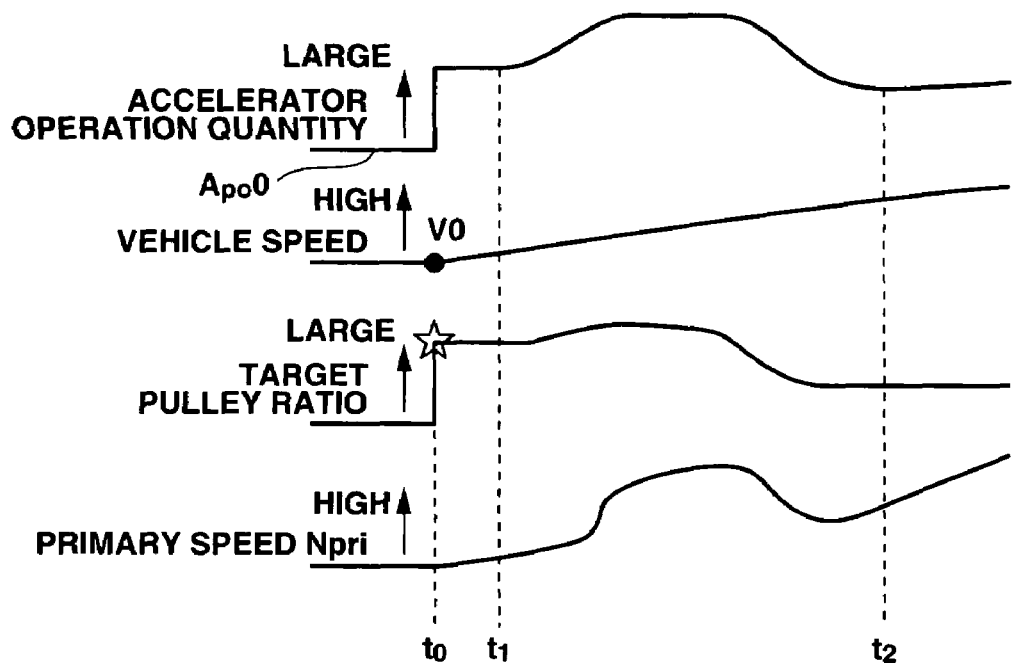
FIG. 5 is a diagram explaining a problem of linear mode control at the time of kickdown operation.

For example, as shown in FIG. 5, when the re-acceleration is started by depressing the accelerator pedal at time point t0, the kickdown is recognized accordingly, and then the map-less shift control (=linear mode shift control) starts. Suppose that the accelerator pedal is further depressed during the time interval between time point t1 and time point t2 during which this map-less shift control is being carried out. In such a case, the pulley-ratio variation amount value RpuX corresponding to the vehicle speed value VX and the accelerator operation quantity value ApoX is increased in accordance with the further depression on accelerator pedal of time point t1. Hence, there is a possibility that the up-shift side correction amount (Rpu0−RpuX) is decreased, and thereby the target pulley ratio [=Rpa0−(Rpu0−RpuX)] is increased toward down-shift side. Moreover in such a case, in accordance with a subsequent return of depression on accelerator pedal of time point t2, the pulley-ratio variation amount value RpuX corresponding to the vehicle speed value VX and the accelerator operation quantity value θacX is decreased. Hence, there is a possibility that the correction amount (Rpu0−RpuX) toward up-shift side is increased, and thereby the target pulley ratio Rpa0 [=Rpa0−(Rpu0−RpuX)] is decreased toward up-shift side.

Figure 6:
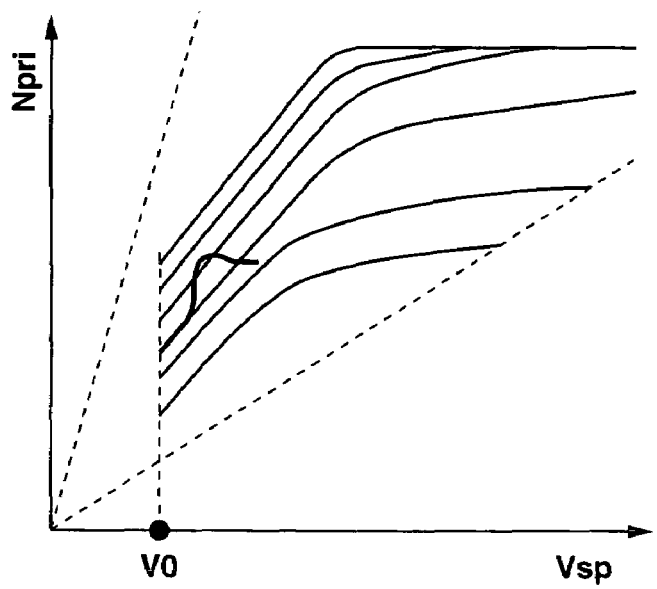
FIG. 6 is a shift-line diagram explaining the problem of linear mode control at the time of kickdown operation.

Therefore, the shift is carried out in response to the depression of accelerator pedal and its return (i.e., depressing-pressure reduction on accelerator pedal) operated from time point t1 to time point t2, as shown in FIGS. 5 and 6 especially a thick line. Although the engine speed (primary pulley input speed) reflects these accelerator operations, the vehicle speed almost does not reflect these accelerator operations. In this case, the control securing the synchronism between the engine speed and the vehicle speed comes to be incapable of being achieved. Therefore in the shift control apparatus of this embodiment, the following detail configurations will be provided in order to secure the synchronism between the engine speed and the vehicle speed even if the additional depression of accelerator pedal or the like is done during the reacceleration produced by the kickdown operation.

[Detailed Configurations]

Figure 7:
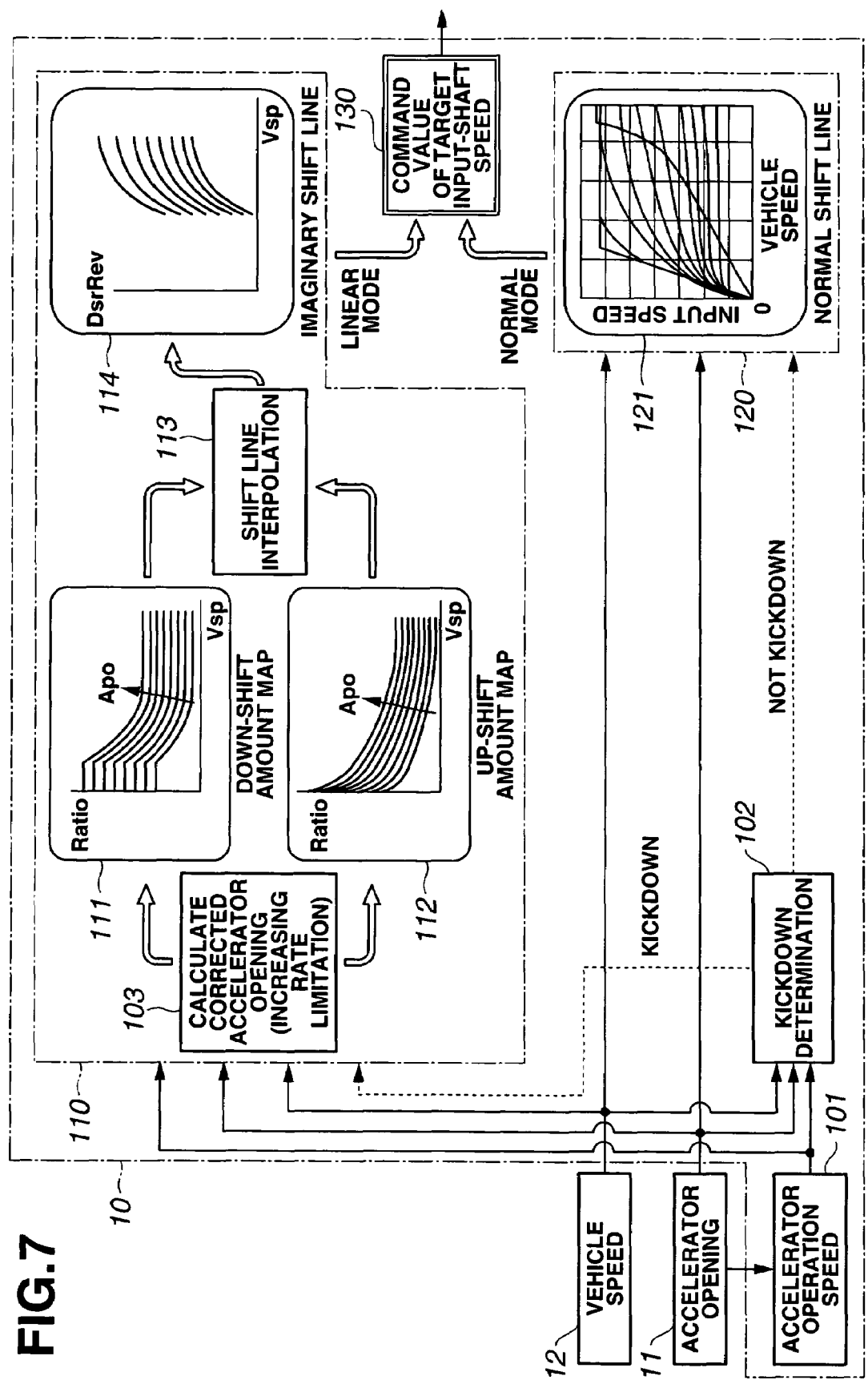
FIG. 7 is a schematic block diagram showing a configuration of shift control apparatus of the embodiment according to the present invention.

FIG. 7 is a schematic block diagram showing a configuration of the shift control section in controller 10. As shown in FIG. 7, controller 10 includes an accelerator-operation-speed calculating section 101, a kickdown-operation determining section 102, an accelerator-opening correcting section 103, a linear-mode shift section (map-less shift section) 110, a normal-mode shift section (regular shift section or map shift section) 120, and a command section 130. Accelerator-operation-speed calculating section 101 calculates an operation speed dApo of accelerator from the detected accelerator operation quantity Aposen. Kickdown-operation determining section 102 determines whether or not the vehicle's driver has done the kickdown operation (namely, whether the driver has expressed his intention to reaccelerate the vehicle), as a kickdown-acceleration request determining section. Accelerator-opening correcting section 103 corrects the detected accelerator opening (value) so as to limit or suppress a variation rate of accelerator operation quantity under a predetermined condition, as an accelerator-operation-quantity variation-rate limiting section. Linear-mode shift section 110 functions when kickdown-operation determining section 102 determines that the kickdown acceleration request is present; and then linear-mode shift section 110 controls or adjusts the speed ratio so as to increase the vehicle speed and engine speed (or primary pulley input speed) in synchronism with each other and substantially linearly, as a kickdown-acceleration-time control section. Namely, linear-mode shift section 110 sets the target speed ratio (kickdown-acceleration-time target speed ratio) so as to cause the output speed of transmission 3 to increase substantially linearly with the increase of input speed of transmission 3. Normal-mode shift section 120 functions when the vehicle is in a normal running condition after the vehicle start except at the time of kickdown operation; and normal-mode shift section 120 controls the shift, by calculating an input speed command value on the basis of a shift map predetermined according to the accelerator operation quantity (or a throttle opening corresponding to this accelerator operation quantity), as a normal-time control section. Command section 130 outputs commands for carrying out the shift motion.

Moreover, normal-mode shift section 120 is configured to control the shift also at the time of vehicle start, by calculating the input speed command value (of the transmission) so as to produce a favorable acceleration also at the time of vehicle start. Accelerator-operation-speed calculating section 101 calculates accelerator operation speed dApo, by differentiating accelerator operation quantity Apo derived from accelerator position sensor 11 with respect to time. Kickdown-operation determining section 102, linear-mode shift section 110, normal-mode shift section 120, and a start-mode shift section (not shown) respectively receive accelerator operation quantity Aposen from accelerator position sensor 11, accelerator operation speed dApo from accelerator-operation-speed calculating section 101, and vehicle speed Vsp from vehicle speed sensor 12.

Kickdown-operation determining section 102 determines that the driver has conducted the kickdown operation, namely that a kickdown acceleration request of the driver is present; in the case where accelerator operation speed dApo is greater than a threshold value dApo1 set or predetermined according to vehicle speed Vsp and accelerator operation quantity Aposen. Then in this case, kickdown-operation determining section 102 selects the (linear mode) shift control by linear-mode shift section 110. In the other cases, kickdown-operation determining section 102 selects the (normal mode) shift control by normal-mode shift section 120 or the start-mode shift section, as the shift control for normal running. Furthermore, kickdown-operation determining section 102 releases the linear-mode shift control, and again selects the normal-mode shift control when a linear-mode release condition is satisfied. This linear-mode release condition is satisfied; when accelerator operation quantity Apo has been returned lower than or equal to a predetermined value after the start (selection) of linear-mode shift control, and a predetermined time period has elapsed from the start time of linear-mode shift control.

Normal-mode shift section 120 checks or determines a normal target input-shaft speed (or normal-time target speed ratio) based on vehicle speed Vsp and accelerator operation quantity Apo, with reference to a normal shift map 121, under the condition of normal running including the start of vehicle. This function corresponds to a normal-time speed ratio determining section or normal-time target input-shaft-speed determining section according to this embodiment. Then, normal-mode shift section 120 transmits the normal target input-shaft speed (value) to command section 130. Additionally, command section 130 conducts the shift motion by driving an actuator of continuously-variable transmission 3 and the like on the basis of the inputted target input-shaft speed.

On the other hand, linear-mode shift section 110 configured to control at the time of kickdown operation includes a down-shift amount regulation map 111, an up-shift amount regulation map 112, and a shift-line interpolation calculating section 113. In down-shift amount regulation map 111, the down-shift characteristic is set with respect to vehicle speed Vsp every range of accelerator operation quantity Apo. Namely, there are a plurality of shift characteristic lines (shift lines) each of which corresponds to one divided range of accelerator operation quantity Apo and provides the down-shift amount as the down-shift target value with respect to vehicle speed Vsp. In other words, the each shift line links vehicle speed Vsp to the target speed ratio for down shift or to the target input speed of transmission 3 for down shift, every range of accelerator operation quantity Apo. In up-shift amount regulation map 112, the up-shift characteristic is set with respect to vehicle speed Vsp every range of accelerator operation quantity Apo. Namely, there are a plurality of shift characteristic lines each of which corresponds to one divided range of accelerator operation quantity Apo and provides the up-shift amount as the up-shift target value with respect to vehicle speed Vsp. In other words, the each shift line links vehicle speed Vsp to the target speed ratio for up shift or to the target input speed of transmission 3 for up shift, every range of accelerator operation quantity Apo. Shift-line interpolation calculating section 113 calculates the down-shift amount and up-shift amount, by means of interpolation processing on values derived from these two maps 111 and 112.

In down-shift amount regulation map 111, the down-shift amount according to vehicle speed Vsp is set every accelerator operation quantity Apo, and the different shift characteristics are set according to a magnitude of accelerator operation quantity Apo. Also in up-shift amount regulation map 112, the up-shift amount according to vehicle speed Vsp is provided every accelerator operation quantity Apo, and the different shift characteristics are set according to the magnitude of accelerator operation quantity Apo.

The number of shift lines which are set in down-shift amount regulation map 111 and the number of shift lines which are set in up-shift amount regulation map 112, are predetermined appropriately in accordance with a resolution capability of accelerator position sensor 11 or a storage capacity of memory medium (such as ROM) of controller 10. In this embodiment, eight shift lines are set by dividing accelerator operation quantity Apo into eight steps. Namely, the shift line is changed in 10° increments of accelerator operation quantity Apo within eight steps from full closed 10° to full open 80°.

Moreover, each of shift lines in down-shift amount regulation map 111 is set so as to bring the down-shift amount smaller as accelerator operation quantity Apo becomes smaller (c.f. lower Apo in map 111 of FIG. 7), and is set so as to bring the down-shift amount greater as accelerator operation quantity Apo becomes greater (c.f. higher Apo in map 111 of FIG. 7). Furthermore, each of shift lines in down-shift amount regulation map 111 is set so as to cause the down-shift amount to become smaller as vehicle speed Vsp becomes higher, and thereby the engine noise is prevented from growing excessively large due to the kickdown acceleration when the vehicle is running at high speed.

The down-shift amount, i.e., target input-shaft speed variation amount in down-shift amount regulation map 111 is suppressed to be smaller than the down-shift amount of same condition in normal shift map 121. In other words, the variation amount of target input-shaft speed DsrRev is set toward smaller side in speed ratio value (i.e., high-speed-side) in down-shift amount regulation map 111, in comparison with the down-shift amount of same condition in normal shift map 121.

On the other hand, in up-shift amount regulation map 112, the up-shift amount relative to the increase in vehicle speed Vsp is set to become greater in the case where accelerator operation quantity Apo is small (c.f. lower Apo in map 112 of FIG. 7). Namely, the up-shift amount is determined from the difference between the speed ratio (variation amount) corresponding to a first value of vehicle speed and the speed ratio corresponding to a second value of vehicle speed, in up-shift amount regulation map 112. This difference is greater in the case of small accelerator operation quantity Apo than that in the case of relatively large accelerator operation quantity Apo. Thus by suppressing the increase of engine speed, a noiseless kickdown acceleration can be attained with a low noise level. In the case where accelerator operation quantity Apo is large (c.f. higher Apo in map 112 of FIG. 7), the up-shift amount relative to the increase in vehicle speed Vsp is set to become smaller. Namely, the up-shift amount which is produced from the difference between the speed ratio corresponding to the first value of vehicle speed and the speed ratio corresponding to the second value of vehicle speed in up-shift amount regulation map 112, is relatively small. Thus by raising the engine speed together with the vehicle speed, the acceleration feeling depending on driver's acceleration intention can be continued. Furthermore in up-shift amount regulation map 112, the shift characteristic is set so as to cause the up-shift amount produced by the increase of vehicle speed Vsp to become greater, in the case of the vehicle speed increase from the time when the vehicle speed Vsp is lower. Namely, the up-shift amount by a constant increasing amount in vehicle speed Vsp at the time of low vehicle speed is greater than that at the time of high vehicle speed. Thereby, the engine is prevented from racing (rapidly rising), and an immediate and smooth start-up of the vehicle acceleration is performed.

Since the shift line is set every step of accelerator operation quantity Apo in down-shift amount regulation map 111 and up-shift amount regulation map 112, there is a case that the inputted accelerator operation quantity Apo does not just fit the down-shift amount or the up-shift amount of the shift lines. Hence, shift-line interpolation calculating section 113 is provided. Shift-line interpolation calculating section 113 calculates the down-shift amount at the time of kickdown operation from down-shift amount regulation map 111, by calculating this amount by means of interpolation with reference to two shift lines before-and-after the inputted accelerator operation quantity Apo. Then after the down-shift has been finished, shift-line interpolation calculating section 113 calculates the up-shift amount from the time of kickdown operation, by calculating this amount by means of the interpolation from up-shift amount regulation map 112. Then, shift-line interpolation calculating section 113 outputs the target input-shaft speed (or target speed ratio) corresponding to the calculated down-shift amount or up-shift amount to command section 130.

The above-mentioned function for selecting the respective down-shift line and up-shift line corresponding to vehicle speed Vsp and accelerator operation quantity Apo when setting the down-shift amount and up-shift amount from regulation maps 111 and 112 and interpolation calculating section 113, is performed in an acceleration shift-characteristic determining section of linear-mode shift section 110. Moreover, the above-mentioned function for calculating the up-shift target speed ratio based on the selected up-shift line, is performed in the up-shift target value calculating section of linear-mode shift section 110. The above-mentioned function for calculating the down-shift target speed ratio based on the selected down-shift line, is performed in the down-shift target value calculating section of linear-mode shift section 110.

Accordingly, the shift characteristic at the time of (and after) kickdown operation results in a trail as shown imaginary shift line 114. Imaginary shift line 114 at the time of kickdown operation shows output results of interpolation calculating section 113, as the trail according to elapsed time. Such a function for calculating imaginary shift line 114 on the basis of the down-shift amount or up-shift amount derived from maps 111 and 112 and interpolation calculating section 113, is performed in an imaginary shift-line producing section of linear-mode shift section 110. Linear-mode shift section 110 controls the shift of transmission 3 in accordance with speed ratio based on the imaginary shift line 114.

In the shift control apparatus according to this embodiment, accelerator-opening correcting section 103 is provided as means for limiting the variation rate (rate of change) of accelerator operation quantity. In this example, accelerator-opening correcting section 103 is included in linear-mode shift section 110. Accelerator-opening correcting section 103 functions when the predetermined variation of the sensed accelerator operation quantity occurs during the speed ratio control of linear-mode shift section 110. Namely, this accelerator-opening correcting section 103 limits the increasing rate or decreasing rate of accelerator operation quantity Apo; when a gradual increase or decrease in accelerator operation quantity (i.e., accelerator opening) is additionally produced, during the control carried out by linear-mode shift section 110 because of the kickdown operation. Namely, at the time of such an additional increase or decrease, accelerator-opening correcting section 103 causes the increasing or decreasing rate of sensed accelerator operation quantity Apo to become slower by means of correction processing, so as not to allow linear-mode shift section 110 to control the shift by directly using the sensed accelerator operation quantity Aposen. Then, accelerator-opening correcting section 103 outputs the corrected accelerator operation quantity to linear-mode shift section 110, in order to set the target speed ratio (kickdown-acceleration-time target speed ratio). Thereby, linear-mode shift section 110 controls the shift by using the corrected accelerator operation quantity Apo calculated by accelerator-opening correcting section 103, at the time of such an additional increase or decrease in accelerator operation quantity.

Concretely, if accelerator operation speed dApo calculated by accelerator-operation-speed calculating section 101 ranges between a lower limit value d1 and an upper limit value d2, namely if the relation d1<|dApo|<d2 is satisfied; accelerator-opening correcting section 103 determines that the gradual increase or decrease in accelerator operation quantity occurs. Lower limit d1 is a threshold value for judging that the accelerator operation quantity has varied. Namely, it is judged that the driver has no intention of varying the vehicle speed, if accelerator operation speed dApo is lower than or equal to lower limit value d1.

Thus in this embodiment, accelerator-opening correcting section 103 imposes a limitation on the increasing rate or the decreasing rate of accelerator operation quantity Apo in the case of gradual (slow) increase or decrease of accelerator operation quantity, as shown in FIGS. 8D to 8F. On the other hand, accelerator-opening correcting section 103 does not limit the increasing rate or the decreasing rate of accelerator operation quantity Apo in the case of rapid variation (especially rapid increase) of accelerator operation quantity Apo, as shown in FIGS. 8A to 8C. The purpose in limiting or reducing the increasing rate or the decreasing rate of accelerator operation quantity Apo is to solve the following problems. Namely, in the shift control of the linear mode, the engine speed increases substantially linearly along (in synchronism with) the increase of vehicle speed in the case where the accelerator opening remains constant after the kickdown. However, when the accelerator pedal is further (additionally) depressed during the shift control of this linear mode, or when the accelerator pedal is returned to its upper position after the further depression; there is a possibility that the variation in accelerator operation quantity is reflected to the engine speed (input speed), but substantially is not reflected to the vehicle speed. In such a case, the control securing the synchronism between the engine speed and the vehicle speed cannot be attained.

However if accelerator operation quantity is increased rapidly, the engine speed quickly rises and the speed ratio reaches its upper limit value (limit of low-speed-side). Since the speed ratio is thereby fixed, the vehicle speed increases so as to follow the increase of engine speed. Hence, if the increasing rate of accelerator operation quantity Apo is limited in this case where accelerator operation quantity is increased rapidly (sharply), longer time is contrariwise consumed for the acceleration of vehicle. Therefore, a (rapid-depression "OPEN") judgment whether the control for limiting the increasing or decreasing rate of accelerator operation quantity Apo should be released, is carried out. Thereby it is determined that the control for limiting the increasing or decreasing rate should be released, in the case of rapid variation (especially rapid increase) of accelerator operation quantity Apo as shown in FIG. 8A. Accordingly, the shift with favorable response is achieved without imposing the limitation on the increasing rate of accelerator operation quantity Apo, as shown in FIGS. 8B and 8C.

On the other hand, in the case where the driver gradually increases the accelerator operation quantity; the increasing-rate limitation control is not released, namely the answer of the rapid-depression judgment is NO, as shown in FIG. 8D. Then, the increase of target input-shaft speed DsrRev is suppressed by imposing the limitation on the variation of accelerator operation quantity Apo, as shown in FIG. 8E. In other words, a variation limiter is made active in this case. Thereby, the driver can feel persistent acceleration (or, can obtain an acceleration feeling of engine flexibility or wide-range ability).

As a concrete means of imposing the limitation on the increasing or decreasing rate of accelerator operation quantity Apo in the case where the accelerator pedal is gradually depressed additionally during the shift control of linear mode, or in the case where the accelerator pedal is gradually returned to its upper position after the additional depression; an accelerator-operation-quantity reference value Apo2 and an accelerator-operation-quantity-variation-rate reference value (accelerator-operation-speed reference value) dApo1 are used. Accelerator-operation-quantity reference value Apo2 is a value of accelerator operation quantity Aposen sensed at the time of determination to limit its increasing or decreasing rate. Accelerator-operation-quantity-variation-rate reference value dApo1 is a value of accelerator operation speed dApo sensed at the time of this determination. At first, these two reference values are stored in memory.

Next, in the case of increase in accelerator operation quantity Apo, greater one of two values of accelerator operation quantity Apo calculated from the following two equations (1) and (2) is set as a value of accelerator operation quantity Apo which is directly used for the shift control.

$$\text{Apo}(n) = \text{Apo2} + (n/2) \times d\text{Apo1} \tag{1}$$

$$\text{Apo}(n) = \text{Apo2} + n \times d1 \tag{2}$$

It is noted that dApo is a variation amount of acceleration operation quantity per one control period, and the driver's acceleration intention (request) can be appropriately determined by using a moving average within a range of proper number of adjacent control periods. Moreover, a variable n of equations (1) and (2) takes a value equal to 1 at the time of the determination of rate limitation, and then is incremented by 1 every control period (i.e., is incremented by 1 whenever one control period has passed).

Although accelerator-operation-quantity-variation-rate reference value dApo1 is multiplied by ½ in equation (1) under n=1, namely is simply reduced in half; this reduction ratio is one example in this embodiment. In reference value dApo1 just needs to be multiplied by a factor a lower than 1 ($\alpha<1$), and factor a can be set as appropriate. Moreover in equation (1), the accelerator-operation-quantity variation rate is limited to a value lower than or equal to lower limit value d1 of accelerator-operation-quantity variation rate (accelerator operation speed), when the value of accelerator-operation-quantity-variation-rate reference value dApo1 is in proximity to lower limit value d1. Thus, since the accelerator-operation-quantity variation rate is excessively limited, equation (2) is provided so as to at least keep the accelerator-operation-quantity variation rate at a value greater than lower limit value d1.

On the other hand, in the case of decrease in accelerator operation quantity Apo, smaller one of two values of accelerator operation quantity Apo calculated from the following two equations (3) and (4) is set as the value of accelerator operation quantity Apo which is directly used for the shift control.

$$Apo(n) = Apo2 - (n/2) \times dApo1 \quad (3)$$

$$Apo(n) = Apo2 \times n \times d1 \quad (4)$$

It is noted that dApo is a variation amount of acceleration operation quantity per one control period, and moreover, a variable n of equations (3) and (4) takes a value equal to 1 at the time of the determination of rate limitation and then is incremented by 1 every control period, in the same manner as mentioned above. The reason for providing equations (3) and (4) is similar as the reason for providing the above equations (1) and (2).

When thus-corrected accelerator operation quantity Apo reaches the sensed accelerator operation quantity Aposen, the control for imposing a limitation on the increasing rate of accelerator operation quantity Apo is finished. Namely, when accelerator operation quantity Apo becomes larger than or equal to the sensed accelerator operation quantity Aposen in the case of increase of accelerator operation quantity Apo, the increasing rate limitation of accelerator operation quantity Apo is finished. When accelerator operation quantity Apo becomes lower than or equal to the sensed accelerator operation quantity Aposen in the case of decrease of accelerator operation quantity Apo, the decreasing rate limitation of accelerator operation quantity Apo is finished.

Figure 9A:
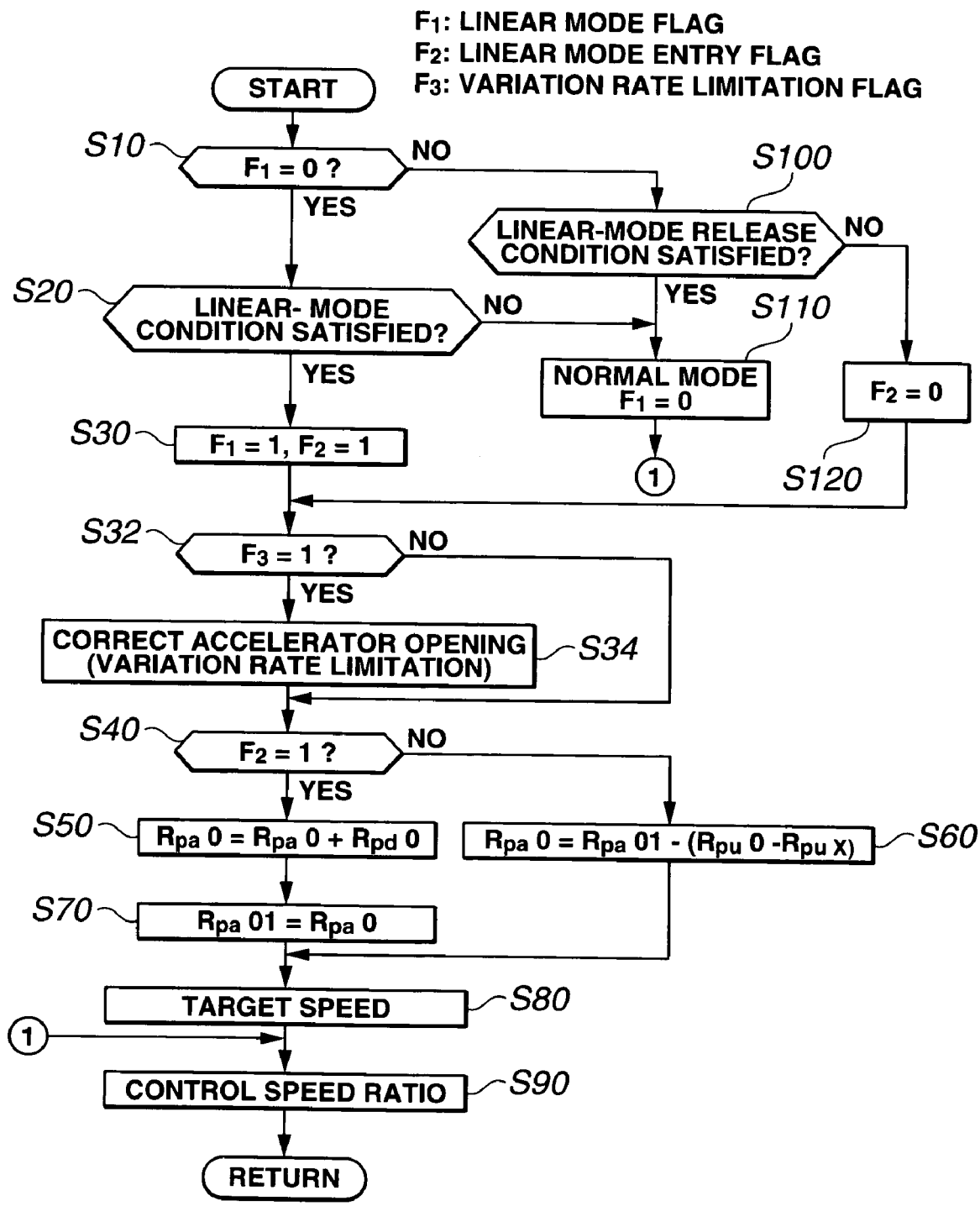
FIGS. 9A to 9C are flowcharts each showing a process of shift control in the shift control apparatus of the embodiment.
Figure 9B:
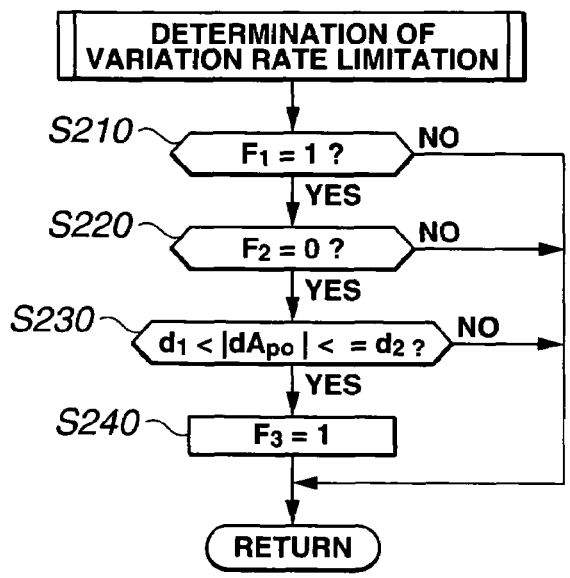
Figure 9C:
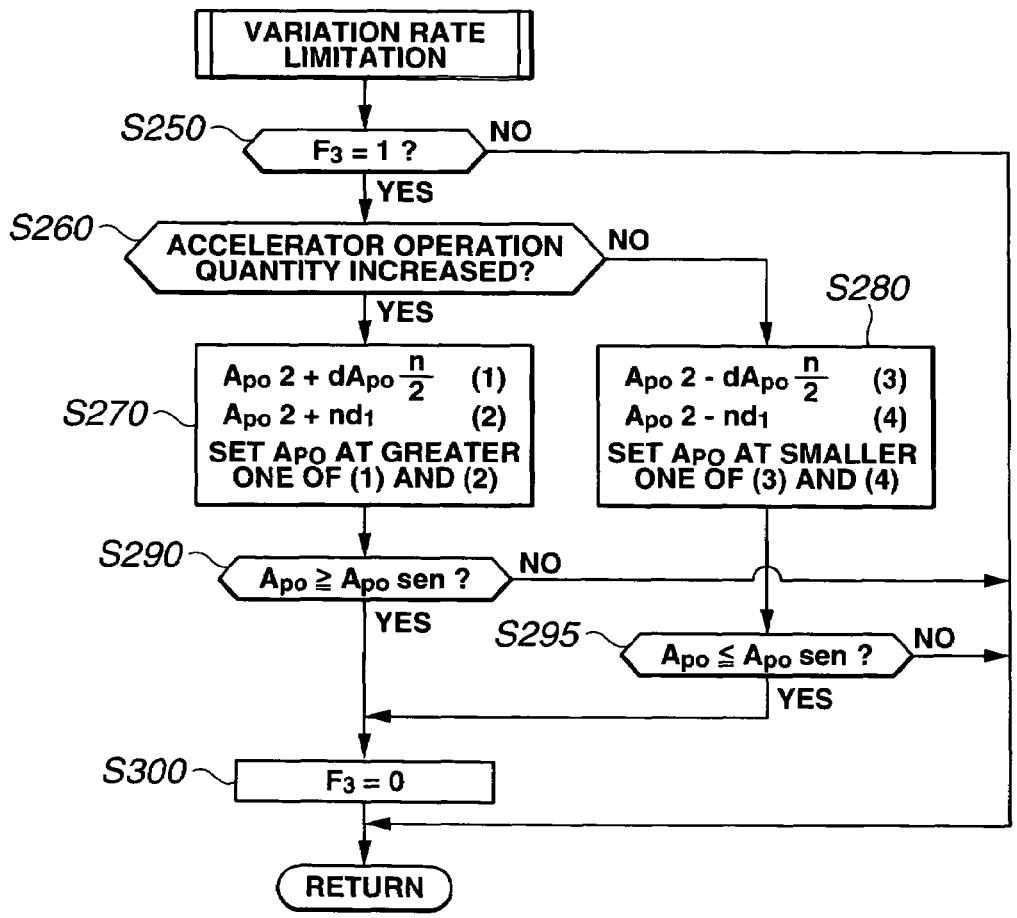

Since the shift control apparatus and method in this first embodiment according to the present invention are constructed as described above, the shift control can be performed for example as shown in FIGS. 9A to 9C. FIGS. 9A to 9C are flowcharts each showing a process of the shift control in this embodiment. Each flowchart shown in FIGS. 9A to 9C is repeated at the predetermined control periods (at regular intervals). At first, the controller determines whether or not a linear-mode flag F1 is "0" at step S10, as shown in FIG. 9A. This linear-mode flag F1 is normally in "0" state, and becomes "1" when the linear mode is selected. Namely, linear-mode flag F1 changes to "1" when kickdown-operation determining section 102 determines that the driver has done the kickdown operation by recognizing that accelerator operation speed dApo has exceeded threshold value dApo1.

If linear-mode flag F1 is in "0" at step S10, namely if the normal mode has been selected; the program proceeds to step S20. At step S20, the controller judges whether or not the linear-mode condition is satisfied, namely judges whether or not the kickdown operation is present. If the controller determines that the linear-mode condition is not satisfied at step S20, namely determines that the kickdown operation is not present; the program proceeds to step S110. At step S110, the controller carries out the shift control of normal-mode. In the normal mode, the controller performs the shift with shift characteristics as shown by dotted lines of FIGS. 11 and 12.

If the controller determines that the linear-mode condition is satisfied at step S20, namely determines that the kickdown operation is present; the program proceeds to step S30. At step S30, the controller sets linear-mode flag F1 to "1", and sets a linear-mode entry flag F2 to "1". Then, the program proceeds to step S32, and the controller determines whether or not a variation-rate limitation flag F3 is in "1" state. This variation-rate limitation flag F3 is normally in "0" state, and is set to be "1" during the mode where the control for limiting the variation rate of accelerator operation quantity is carried out.

If variation-rate limitation flag F3 is in "0" state at step S32, the program proceeds to step S40. At step S40, the controller determines whether or not linear-mode entry flag F2 is in "1" state. If linear-mode entry flag F2 is in "1" state at step S40, namely if the linear mode has been selected (the shift control enters the linear mode) in current control period, the program proceeds to step S50. At step S50, the controller calculates the down-shift amount Rpd0 which corresponds to vehicle speed Vsp and accelerator operation quantity Apo of the time of kickdown operation, by using down-shift amount regulation map 111 and interpolation calculating section 113. Then the controller sets new target speed ratio Rpa0 by adding this down-shift amount Rpd0 to the current target speed ratio Rpa0 (i.e., target speed ratio used in last-time control period), as shown by the following equation (5).

$$Rpa0 = Rpa0 + Rpd0 \quad (5)$$

Then at step S70, the controller stores this new target speed ratio Rpa0 as a linear-mode-entry-time target speed ratio Rpa01.

At step S10, if linear-mode flag F1 is in "1" state, namely if the linear mode has been selected before current control period; the program proceeds to step S100. At step S100, the controller determines whether or not the linear-mode release condition is satisfied. Namely the controller determines that the linear-mode release condition is satisfied; under a condition where accelerator operation quantity Apo has been returned lower than or equal to the predetermined quantity after the start of linear mode, and the predetermined time has elapsed from the start time of linear mode. In this case, the program proceeds to step S110, and the controller carries out the shift control of normal mode.

If the linear-mode release condition is not satisfied at step S100, the program proceeds to step S120. At step S120, the controller sets linear-mode entry flag F2 to "0", and the program proceeds to step S32. Then, the program proceeds to step S40 and step S60, via step S32 or via steps S32 and S34. At step S60, the controller calculates the up-shift amount Rpu0 which corresponds to vehicle speed Vsp and accelerator operation quantity Apo of the time of kickdown operation and the up-shift amount RpuX which corresponds to vehicle speed Vsp and accelerator operation quantity Apo of current time, by using up-shift amount regulation map 112 and interpolation calculating section 113. Then the controller sets new target speed ratio Rpa0 by subtracting the difference of these values (Rpu0−RpuX) from linear-mode-entry-time target speed ratio Rpa01, as shown by the following equation (6).

$$Rpa0=Rpa01-(Rpu0-RpuX) \quad (6)$$

Then at step 580, the controller calculates target input-shaft speed DsrRev from this set target speed ratio Rpa0 and a currently sensed value of output-shaft rotational speed OutRev, as shown by the following equation (7). Then the controller actually controls the speed ratio at step S90.

$$DsrRev=Rpa0 \times OutRev \quad (7)$$

Figure 11:
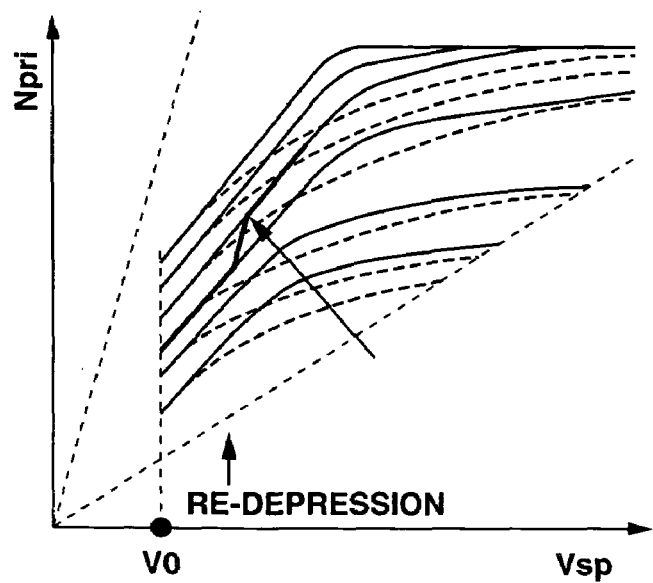
FIG. 11 is a diagram showing shift lines of shift control during the linear mode and a normal mode, and showing a shift line resulting from the variation-rate limitation of accelerator operation quantity during the linear mode control, in the shift control apparatus of the embodiment.
Figure 12:
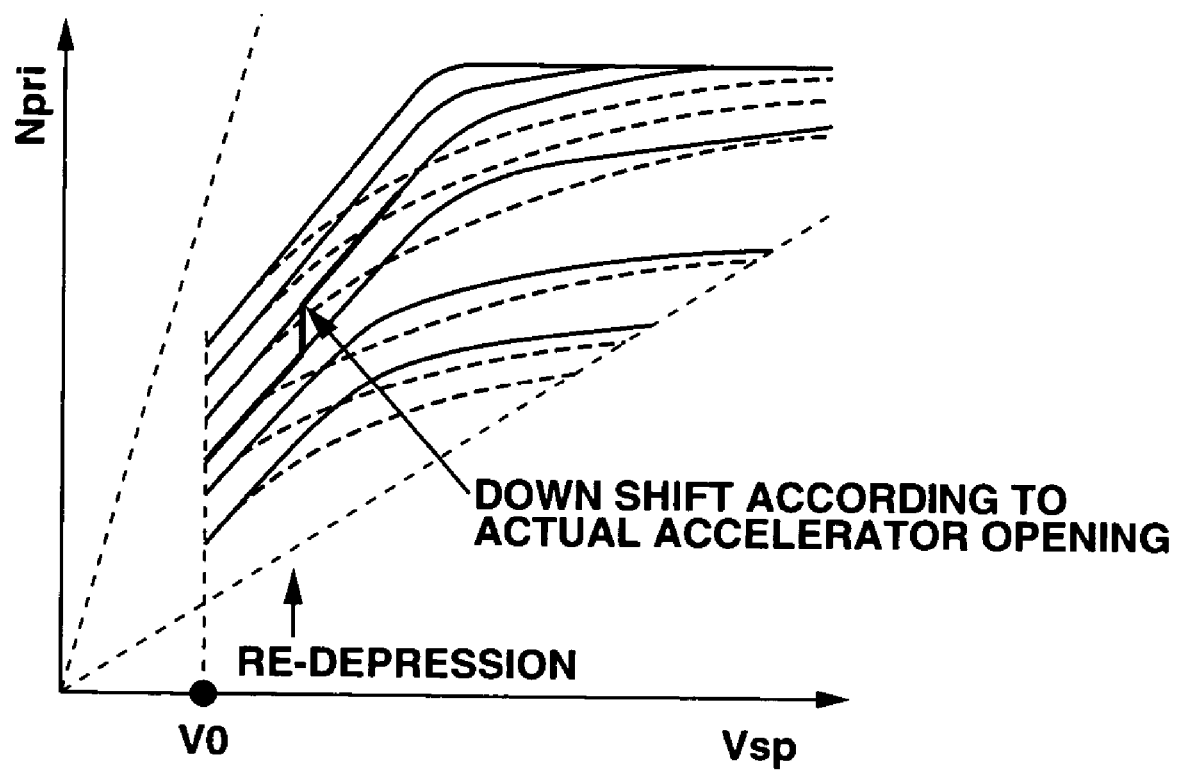
FIG. 12 is a diagram showing shift lines of the linear mode control and the normal mode control in the shift control apparatus of the embodiment.

Thus in the case of the kickdown operation, the shift is controlled with shift characteristics as shown by thin solid lines of FIGS. 11 and 12. At first, the down-shift amount of target speed ratio Rpa0 is set by map 111 and equation (5), so as to be more suppressed as compared to that of normal mode as the accelerator operation quantity becomes smaller. Hence, the situation where only input-shaft speed inREV (=engine speed Ne) rises but vehicle speed Vsp hardly rises, can be avoided. Next, the shift down comes to be suppressed in accordance with the increase of vehicle speed, by means of map 112 and the equation (6). Thereby, the speed ratio is gradually adjusted to up-shift side under the state where vehicle speed Vsp and input-shaft speed inREV vary substantially linearly with each other (i.e., vary with synchronism between vehicle speed Vsp and input-shaft speed inREV; in other words, vehicle speed Vsp increases along the increase of input-shaft speed inREV). Accordingly, the vehicle speed Vsp effectively reflects the engine speed.

Moreover, acceleration response and acceleration continuation (extensibility) with the ideal shift characteristic can be obtained at the time of kickdown operation, without receiving constraints given by shift lines on shift map 121 of earlier technology. Therefore, the acceleration feeling according to driver's acceleration intention can be achieved. Furthermore in the up-shift mode, the optimal variation of up-shift amount can be produced in response to the variation of driver's accelerator operation, and the acceleration extensibility can be achieved in conformity with the driver's acceleration request.

Here, the explanation about the setting of variation-rate limitation flag F3 will now be described with reference to FIG. 9B. As shown in FIG. 9B, the controller determines whether or not linear-mode flag F1 is "1", namely whether or not in linear mode, at step S210. If the answer of step S210 is YES, the program proceeds to step S220. At step S220, the controller determines whether or not linear-mode entry flag F2 is "0", namely whether or not during a control period later than the control period during which the linear mode started. If the answer of step S220 is YES, the program proceeds to step S230. At step S230, the controller judges whether or not the accelerator operation quantity has been gradually increased or decreased, in the case where linear-mode flag F1 is "1" and linear-mode entry flag F2 is "0" as the result of judgments of steps S210 and S220. Namely at step S230, the controller determines whether or not accelerator operation speed dApo calculated by accelerator-operation-speed calculating section 101 ranges between lower limit value d1 and upper limit value d2, namely whether or not the relation (d1<|dApo|<d2) is satisfied. If the controller determines that gradual increase or decrease of accelerator operation quantity is present, namely that accelerator operation speed dApo ranges between lower reference value d1 and upper reference value d2; the program proceeds to step S240. At step S240, the controller sets variation-rate limitation flag F3 to "1".

As shown in FIG. 9C, if variation-rate limitation flag F3 is "1", the program proceeds from step S250 to step S260. At step S260, the controller determines whether the gradual variation of accelerator operation quantity is an increase or a decrease (i.e., whether increasing variation or decreasing variation). If the gradual variation is an increasing variation, the program proceeds to step S270. At step S270, the controller sets greater one of two accelerator operation quantity's values calculated by the above-mentioned equations (1) and (2), as accelerator operation quantity Apo to be used for the shift control (the speed ratio control). Then the program proceeds to step S290. At the step S290, the controller judges whether or not accelerator operation quantity Apo is greater than or equal to the sensed accelerator operation quantity Aposen, namely whether or not the calculated accelerator operation quantity Apo has reached the sensed accelerator operation quantity Aposen. If the answer of step S290 is YES, the program proceeds to step S300. At the step S300, the controller sets variation-rate limitation flag F3 to "0", and terminates the variation rate limitation for accelerator operation quantity Apo.

On the other hand, if the gradual variation is a decreasing variation, the program proceeds to step S280. At step S280, the controller sets smaller one of two accelerator operation quantity's values calculated by the above-mentioned equations (3) and (4), as accelerator operation quantity Apo to be used for the shift control. Then the program proceeds to step S295. At the step S295, the controller judges whether or not accelerator operation quantity Apo is smaller than or equal to the sensed accelerator operation quantity Aposen, namely whether or not the calculated accelerator operation quantity Apo has reached the sensed accelerator operation quantity Aposen. If the answer of step S295 is YES, the program proceeds to step S300. At the step S300, the controller sets variation-rate limitation flag F3 to "0", and terminates the variation rate limitation for accelerator operation quantity Apo.

Figure 10:
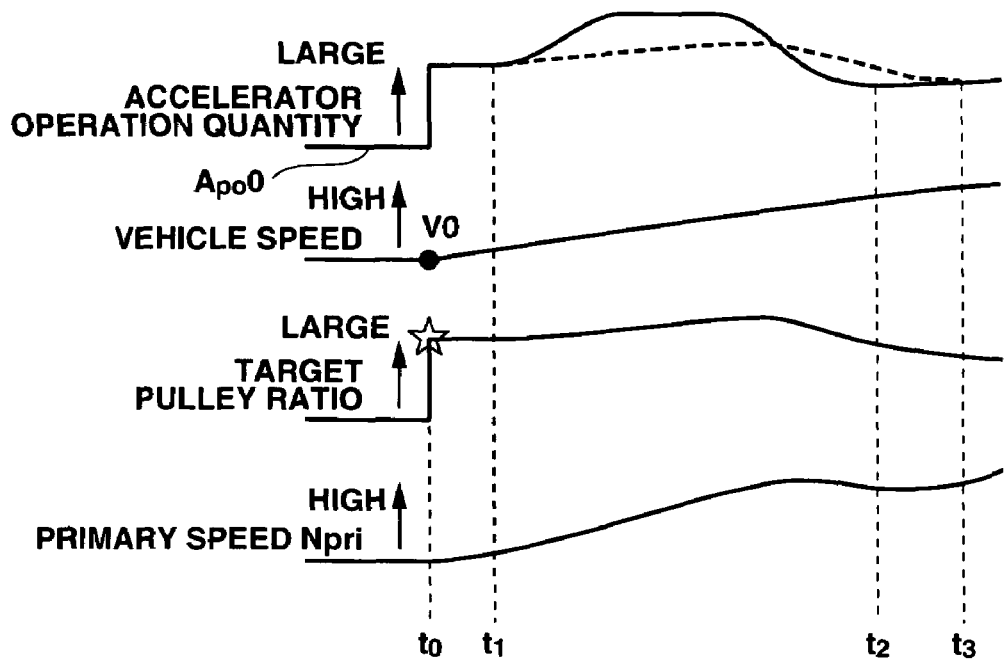
FIG. 10 is a time chart explaining the variation-rate limitation of accelerator operation quantity during the linear mode control in the shift control apparatus of the embodiment.

Accordingly for example, as shown in FIG. 10, the kickdown occurs and the linear mode is started at time point t0. Then during this linear mode, an operation which gradually increases accelerator operation quantity Aposen starts for example at time point t1, as shown by a solid line of FIG. 10. In this case, the target pulley ratio [=Rpa0−(Rpu0−RpuX)] is increased toward down-shift side if the increasing rate limitation for accelerator operation quantity Apo is not executed. Namely if the increasing rate limitation is not executed; since the pulley-ratio variation amount RpuX corresponding to the vehicle speed value VX and the accelerator operation quantity value θacX is increased as accelerator operation quantity Apo becomes larger, the correction amount (Rpu0−RpuX) toward up-shift side is reduced. On the contrary in this embodiment, the increasing rate limitation is imposed on accelerator operation quantity Apo which is used for the shift control as shown by a dotted line of FIG. 10. Hence, the target pulley ratio's increase toward down-shift side is suppressed. Thereby, the vehicle speed increases substantially in synchronism (substantially linearly) with the increase of engine speed, from the time when the accelerator operation quantity started to be increased, as shown by a thick line of FIG. 11. Therefore, the smooth acceleration feel can be obtained by the driver.

On the other hand, in the case where the rapid increase of accelerator operation quantity occurs during the linear mode; a definite down shift is carried out in almost similar manner as at the start time of kickdown, and the engine speed rapidly rises as shown by a thick solid line of FIG. 12. Subsequently, the vehicle speed continues to be increased along with the increase of engine speed as shown by the thick solid line of FIG. 12, and the driver can feel a favorable-response acceleration and feel a gravitational force.

[Configurations and Effects According to the Present Invention]

In the shift control apparatus and method for a continuously-variable transmission according to the above-described embodiment of the present invention; while the vehicle runs under the normal condition where the kickdown acceleration request is not present, the shift control (normal-time control) is carried out in accordance with the normal-time target speed ratio which is determined based on the vehicle speed and the accelerator operation quantity by the speed ratio determining section. On the other hand, when the kickdown acceleration request is present, the shift control (kickdown-acceleration-time control) is carried out in accordance with the kickdown-time target speed ratio which is determined based on the vehicle speed and the accelerator operation quantity so as to cause the output rotational speed of transmission to increase substantially linearly with the increase of input rotational speed of transmission. Then, when the predetermined variation of accelerator operation quantity occurs during the speed ratio control of the kickdown-acceleration-time control; the corrected accelerator operation quantity is calculated by imposing a limitation on the variation rate of sensed accelerator operation quantity, and the down-shift target speed ratio and up-shift target speed ratio for the kickdown-acceleration-time control are set in accordance with this corrected accelerator operation quantity. Therefore, the variation of accelerator operation quantity is suppressed as compared to its actual variation, during the kickdown-acceleration-time control. Since the down-shift target speed ratio and up-shift target speed ratio reflect this suppression (receive this suppression result), the variation of down-shift target speed ratio or up-shift target speed ratio can be suppressed. Accordingly, the vehicle speed comes to be easy to reflect the variation of engine speed which varies together with the variation of accelerator operation quantity, thereby the synchronism or the linearity between the engine speed and the vehicle speed can be secured.

Moreover in the shift control apparatus and method according to the above-described embodiment, the corrected accelerator operation quantity is calculated when the accelerator operation quantity increases additionally and its increasing rate is lower than the predetermined reference increasing-rate value. Therefore in the case where the accelerator operation quantity rapidly increases; the down shift is certainly carried out substantially in the similar manner as at the start time of kickdown, thereby the engine speed rises and afterwards the vehicle speed rises together with the engine speed. In the case where the accelerator operation quantity gradually increases; the engine speed and the vehicle speed rise synchronously (linearly) from the time point when the accelerator operation quantity started increasing. Accordingly, the smooth acceleration feel can be attained.

Furthermore in the shift control apparatus and method according to the above-described embodiment; the target speed ratio for down shift is determined in accordance with the vehicle speed and the accelerator operation quantity at the time of kickdown operation, so as to be suppressed more than the normal-time target speed ratio determined under the same condition of vehicle speed and accelerator operation quantity. Then, the target speed ratio for up shift is determined in accordance with the current vehicle speed and accelerator operation quantity. Therefore, the down shift is carried out by using the suppressed down-shift target speed ratio (value) derived from the down-shift characteristic, afterwards the up shift is carried out by using the up-shift target speed ratio derived from the up-shift characteristic. Accordingly, the excessive increase of engine speed and the decrease of vehicle acceleration are suppressed while the vehicle is accelerating. Thereby, an initial rise of vehicle acceleration and a drop of vehicle acceleration can be kept in balance, and the vehicle acceleration according to the driver's acceleration request can be faithfully achieved. Namely, the acceleration response and acceleration extensibility based on ideal shift characteristics are achieved at the time of kickdown operation, without being affected by the shift characteristics used for the normal shift control performed by normal-time control section. Thereby, the acceleration feel in response to the driver's acceleration request can continue to be obtained. Moreover when the up shift is carried out, the appropriate variation of up-shift amount responding to the accelerator's variation manipulated by the driver can be provided, and thereby the acceleration continuation can be achieved in compliance with the driver's request.

Furthermore in the shift control apparatus and method according to the above-described embodiment; the shift line linking the vehicle speed to the target speed ratio or to the target input-shaft speed of transmission is set every accelerator operation quantity (namely, a plurality of shift lines are set with respect to the degree of accelerator operation quantity), as the down-shift characteristics. In the same manner, the shift line linking the vehicle speed to the target speed ratio or to the target input-shaft speed of transmission is set every accelerator operation quantity, as the up-shit characteristics. Therefore, the shift characteristic can be optimally provided under any conditions of the accelerator operation quantity and the vehicle speed. The kickdown acceleration can be achieved without receiving constraints given by the shift characteristics which are used for the normal shift control by the normal-time speed ratio determining section.

Furthermore in the shift control apparatus and method according to the above-described embodiment; the down-shift target speed ratio and the up-shift target speed ratio are respectively calculated in accordance with the vehicle speed, the accelerator operation quantity, and the shift lines, by using the interpolation processing. Therefore, the optimal shift characteristic can be calculated by means of interpolation processing, even if the shift characteristic directly corresponding to the sensed accelerator operation quantity does not exist in a characteristics table or diagram. Accordingly, the imaginary shift line suitable for the operating condition of vehicle can be produced.

Furthermore in the shift control apparatus and method according to the above-described embodiment; the kickdown-acceleration request determining section determines that the kickdown acceleration request is present when the accelerator operation speed exceeds the reference value predetermined according to the vehicle speed and accelerator operation quantity. Therefore, an erroneous judgment on kickdown acceleration (request) can be prevented, and the driver's intention of accelerating the vehicle by means of kickdown can be accurately detected.

Although the invention has been described above with reference to certain embodiments of the invention, the invention is not limited to the embodiments described above. Modifications and variations of the embodiments described above will occur to those skilled in the art in light of the above teachings. For example in the above-described embodiment, the shift control at the time of kickdown is performed in accordance with the downshift characteristic and the upshift characteristic as shown in maps 111 and 112 of FIG. 7.

However, the setting of these characteristics can be suitably modified, in light of a technical thinking that the shift is controlled so as to cause the vehicle speed (output rotational speed of transmission) and the engine rotational speed (input rotational speed of transmission) to increase in synchronism with each other. Moreover, in the above-described embodiment, accelerator operation quantity Apo is corrected by equations (1) to (4) in the case where the accelerator operation quantity varies during the kickdown acceleration control. However, the correction shown by equations (1) to (4) is one example, and various variation-rate (quantity) limitations are conceivable. For example, the following equation (8) may be used at the time of increase of accelerator operation quantity, and the following equation (9) may be used at the time of decrease of accelerator operation quantity; by focusing on the difference [dApo1−d1] between lower limit value d1 of variation rate of accelerator operation quantity and variation rate (accelerator-operation-quantity-variation-rate reference value) dApo1 sensed at the time when accelerator operation quantity starts to vary.

$$Apo(n)=Apo2+(n/2)\times(dApo1-d1) \quad (8)$$

$$Apo(n)=Apo2-(n/2)\times(dApo1-d1) \quad (9)$$

In the above-described embodiments according to the present invention, the operating condition sensing section can correspond to means for sensing an operating condition of a vehicle. The normal-time speed ratio determining section can correspond to means for determining a normal-time target speed ratio of the continuously-variable transmission in accordance with the sensed vehicle speed and the accelerator operation quantity. The normal-time control section can correspond to means for controlling a speed ratio of the continuously-variable transmission in accordance with the determined normal-time target speed ratio. The kickdown-acceleration request determining section can correspond to means for determining whether or not a kickdown acceleration request is present. The kickdown-acceleration-time control section can correspond to means for setting a kickdown-acceleration-time target speed ratio when it is determined that the kickdown acceleration request is present, and controlling the speed ratio in accordance with the kickdown-acceleration-time target speed ratio. The accelerator-operation-quantity variation-rate limiting section can correspond to means for calculating a corrected accelerator operation quantity by imposing a limitation on a variation rate of the sensed accelerator operation quantity, and setting the kickdown-acceleration-time target speed ratio in accordance with the corrected accelerator operation quantity.

This application is based on a prior Japanese Patent Application No. 2005-127936 filed on Apr. 26, 2005. The entire contents of this Japanese Patent Application are hereby incorporated by reference.

The scope of the invention is defined with reference to the following claims.

What is claimed is:

1. A shift control apparatus for a continuously-variable transmission, comprising:
   an operating condition sensing section configured to sense an operating condition of a vehicle, the operating condition including a vehicle speed and an accelerator operation quantity;
   a normal-time speed ratio determining section configured to determine a normal-time target speed ratio of the continuously-variable transmission in accordance with the vehicle speed and the accelerator operation quantity sensed by the operating condition sensing section;
   a normal-time control section configured to control a speed ratio of the continuously-variable transmission in accordance with the normal-time target speed ratio determined by the normal-time speed ratio determining section;
   a kickdown-acceleration request determining section configured to determine whether or not a kickdown acceleration request is present, in accordance with the accelerator operation quantity sensed by the operating condition sensing section;
   a kickdown-acceleration-time control section configured
      to set a kickdown-acceleration-time target speed ratio in accordance with the vehicle speed and the accelerator operation quantity sensed by the operating condition sensing section, to cause an output rotational speed of the continuously-variable transmission to increase substantially linearly with an increase of input rotational speed of the continuously-variable transmission, when the kickdown-acceleration request determining section determines that the kickdown acceleration request is present, and
      to control the speed ratio in accordance with the kickdown-acceleration-time target speed ratio instead of the normal-time target speed ratio; and
   an accelerator-operation-quantity variation-rate limiting section configured
      to calculate a corrected accelerator operation quantity by imposing a limitation on a variation rate of the accelerator operation quantity sensed by the operating condition sensing section, when a predetermined variation of the sensed accelerator operation quantity occurs during the speed ratio control of the kickdown-acceleration-time control section, and
      to output the corrected accelerator operation quantity to the kickdown-acceleration-time control section in order to set the kickdown-acceleration-time target speed ratio.

2. The shift control apparatus as claimed in claim 1, wherein the predetermined variation of the accelerator operation quantity is defined by a condition where the accelerator operation quantity is gradually increased at an increasing rate lower than a predetermined reference increasing rate.

3. The shift control apparatus as claimed in claim 1, wherein
   the kickdown-acceleration-time control section includes;
      an acceleration shift-characteristic determining section configured to determine a shift characteristic of down shift and a shift characteristic of up shift respectively in accordance with the vehicle speed and the accelerator operation quantity;
      a down-shift target-value calculating section configured to calculate a target speed ratio for down shift, to suppress the target speed ratio for down shift more than the normal-time target speed ratio determined by the normal-time speed ratio determining section under the same condition of vehicle speed and accelerator operation quantity, on the basis of the shift characteristic of down shift;
      an up-shift target-value calculating section configured to calculate a target speed ratio for up shift on the basis of the shift characteristic of up shift; and
      an imaginary shift-line producing section configured to calculate an imaginary shift line that provides the kickdown-acceleration-time target speed ratio so as to shift the speed ratio downwardly to the down-shift target speed ratio calculated by the down-shift target-value calculating section and subsequently so as to shift the speed ratio upwardly in accordance with the up-shift target speed ratio calculated by the up-shift target-value calculating section; and wherein the kickdown-acceleration-time control section is configured to control a shift of the continuously-variable transmission in accordance with the speed ratio based on the imaginary shift line produced by the imaginary shift-line producing section instead of the normal-time speed ratio determining section, when the kickdown-acceleration request determining section determines that the kickdown acceleration request is present.

4. The shift control apparatus as claimed in claim 3, wherein the acceleration shift-characteristic determining section is configured to set a first plurality of shift lines as the shift characteristics of down shift by setting the shift line every range of accelerator operation quantity, the first plurality of shift lines each linking the vehicle speed to the speed ratio or to a target rotational speed of input shaft of the continuously-variable transmission, and to set a second plurality of shift lines as the shift characteristics of up shift by setting the shift line every range of accelerator operation quantity, the second plurality of shift lines each linking the vehicle speed to the speed ratio or to the target rotational speed of input shaft of the continuously-variable transmission.

5. The shift control apparatus as claimed in claim 4, wherein the down-shift target-value calculating section is configured to calculate the target speed ratio for down shift in accordance with the vehicle speed, the accelerator operation quantity, and the first plurality of shift lines, by using an interpolation processing; and the up-shift target-value calculating section is configured to calculate the target speed ratio for up shift in accordance with the vehicle speed, the accelerator operation quantity, and the second plurality of shift lines, by using the interpolation processing.

6. The shift control apparatus as claimed in claim 1, wherein the kickdown-acceleration request determining section is configured to detect an accelerator operation speed from the accelerator operation quantity, to check a predetermined reference value according to the vehicle speed and the accelerator operation quantity, and to determine that the kickdown acceleration request is present when the accelerator operation speed exceeds the reference value.

7. The shift control apparatus as claimed in claim 1, wherein the accelerator-operation-quantity variation-rate limiting section is configured to reduce the variation rate of the sensed accelerator operation quantity to cause the corrected accelerator operation quantity to vary more slowly than the sensed accelerator operation quantity.

8. The shift control apparatus as claimed in claim 1, wherein the accelerator-operation-quantity variation-rate limiting section is configured to suppress the variation rate of the sensed accelerator operation quantity to suppress a down shift amount of the continuously-variable transmission, when the predetermined variation of the sensed accelerator operation quantity occurs during the speed ratio control of the kickdown-acceleration-time control section.

9. The shift control apparatus as claimed in claim 1, wherein the accelerator-operation-quantity variation-rate limiting section is configured to suppress the variation rate of the sensed accelerator operation quantity to continue to cause the output rotational speed of the continuously-variable transmission to increase substantially linearly with the increase of input rotational speed of the continuously-variable transmission, when the predetermined variation of the sensed accelerator operation quantity occurs during the speed ratio control of the kickdown-acceleration-time control section.

10. A shift control method for a continuously-variable transmission, comprising:

sensing an operating condition of a vehicle, the operating condition including a vehicle speed and an accelerator operation quantity;

determining a normal-time target speed ratio of the continuously-variable transmission in accordance with the sensed vehicle speed and the sensed accelerator operation quantity, under a normal running of the vehicle;

controlling a speed ratio of the continuously-variable transmission in accordance with the determined normal-time target speed ratio;

determining whether or not a kickdown acceleration request is present, in accordance with the sensed accelerator operation quantity;

setting a kickdown-acceleration-time target speed ratio in accordance with the sensed vehicle speed and the sensed accelerator operation quantity, to cause an output rotational speed of the continuously-variable transmission to increase substantially linearly with an increase of input rotational speed of the continuously-variable transmission, when determining that the kickdown acceleration request is present under the normal running of the vehicle;

controlling the speed ratio in accordance with the set kickdown-acceleration-time target speed ratio instead of the normal-time target speed ratio;

calculating a corrected accelerator operation quantity by imposing a limitation on a variation rate of the sensed accelerator operation quantity, when a predetermined variation of the sensed accelerator operation quantity occurs during the speed ratio control according to the kickdown-acceleration-time target speed ratio; and setting the kickdown-acceleration-time target speed ratio in accordance with the corrected accelerator operation quantity.

11. The shift control method as claimed in claim 10, wherein the predetermined variation of the accelerator operation quantity is defined by a condition where the accelerator operation quantity is gradually increased at an increasing rate lower than a predetermined reference increasing rate.

12. A shift control apparatus for a continuously-variable transmission, comprising:

means for sensing an operating condition of a vehicle, the operating condition including a vehicle speed and an accelerator operation quantity;

means for determining a normal-time target speed ratio of the continuously-variable transmission in accordance with the sensed vehicle speed and the accelerator operation quantity;

means for controlling a speed ratio of the continuously-variable transmission in accordance with the determined normal-time target speed ratio;

means for determining whether or not a kickdown acceleration request is present, in accordance with the sensed accelerator operation quantity;

means for setting a kickdown-acceleration-time target speed ratio in accordance with the sensed vehicle speed and the sensed accelerator operation quantity, to cause an output rotational speed of the continuously-variable transmission to increase substantially linearly with an increase of input rotational speed of the continuously-variable transmission, when it is determined that the kickdown acceleration request is present, and controlling the speed ratio in accordance with the kickdown-acceleration-time target speed ratio instead of the normal-time target speed ratio; and means for calculating a corrected accelerator operation quantity by imposing a limitation on a variation rate of the sensed accelerator operation quantity, when a predetermined variation of the sensed accelerator operation quantity occurs during the speed ratio control according to the kickdown-acceleration-time target speed ratio, and setting the kickdown-acceleration-time target speed ratio in accordance with the corrected accelerator operation quantity instead of the sensed accelerator operation quantity.

* * * * *